United States Patent
Diebolt

(10) Patent No.: US 11,352,249 B2
(45) Date of Patent: Jun. 7, 2022

(54) THERMAL CONTROLLED HOSE ASSEMBLY FOR DISPENSING FLUID

(71) Applicant: Mark C. Diebolt, Old Lyme, CT (US)

(72) Inventor: Mark C. Diebolt, Old Lyme, CT (US)

( * ) Notice: Subject to any disclaimer, the term of this patent is extended or adjusted under 35 U.S.C. 154(b) by 277 days.

(21) Appl. No.: 16/446,045

(22) Filed: Jun. 19, 2019

(65) Prior Publication Data

US 2020/0071154 A1 Mar. 5, 2020

Related U.S. Application Data

(60) Provisional application No. 62/744,409, filed on Oct. 11, 2018, provisional application No. 62/686,847, filed on Jun. 19, 2018.

(51) Int. Cl.
*B67D 7/82* (2010.01)
*F01N 3/20* (2006.01)
*B67D 7/42* (2010.01)

(52) U.S. Cl.
CPC ............. *B67D 7/82* (2013.01); *B67D 7/42* (2013.01); *F01N 3/208* (2013.01); *F01N 2610/02* (2013.01); *F01N 2610/105* (2013.01); *F01N 2610/1413* (2013.01); *F01N 2610/1486* (2013.01)

(58) Field of Classification Search
CPC ........................ H05B 3/58; H05B 2203/021; H05B 2214/03; B67D 7/02; B67D 7/42; B67D 7/3218; B67D 7/38; F01N 3/208; F01N 3/2066; F01N 2610/02; F01N 2610/105; F01N 2610/1413; F01N 2610/1486; F01N 2610/10; F16L 63/38; F16F 53/38

USPC ................... 222/540, 146.2, 146.5
See application file for complete search history.

(56) References Cited

U.S. PATENT DOCUMENTS

| | | | | |
|---|---|---|---|---|
| 1,809,714 A | * | 6/1931 | Carl | F16L 53/38 |
| | | | | 219/522 |
| 4,424,422 A | * | 1/1984 | Bell | F02M 31/125 |
| | | | | 219/205 |
| 9,637,370 B2 | * | 5/2017 | Shelton | B67D 7/84 |
| 9,771,254 B2 | * | 9/2017 | Larsson | B67D 7/42 |
| 2014/0261882 A1 | * | 9/2014 | Lambrix | B67D 7/04 |
| | | | | 141/94 |
| 2015/0233275 A1 | * | 8/2015 | Larsson | B67D 7/08 |
| | | | | 222/54 |
| 2015/0298962 A1 | * | 10/2015 | Shelton | B67D 7/42 |
| | | | | 141/82 |
| 2016/0280532 A1 | * | 9/2016 | Mcclelland | B67D 7/82 |

* cited by examiner

*Primary Examiner* — Lien M Ngo
(74) *Attorney, Agent, or Firm* — Steven M. McHugh

(57) ABSTRACT

A thermal controlled hose assembly is provided and includes an adapter which defines an adapter cavity, wherein the adapter is configured to receive a DEF fluid within the adapter cavity, a hose, wherein the hose defines a hose cavity and wherein the hose is connected to the adapter such that the hose cavity is in flow communication with the adapter cavity, a nozzle, wherein the nozzle includes an inlet port and an outlet port and defines a fluid flow channel which communicates the inlet port with the outlet port, and wherein the nozzle is connected with the hose such that the fluid flow channel is in flow communication with the hose cavity and a heating system, wherein the heating system includes a heating element which is configured to be in contact with at least a portion of at least one of the adapter, the hose and the nozzle.

20 Claims, 14 Drawing Sheets

THERMAL CONTROLLED HOSE ASSEMBLY FOR DISPENSING FLUID

CROSS REFERENCE TO RELATED APPLICATIONS

This application is a continuation-in-part of U.S. Non-Provisional patent application Ser. No. 15/795,340 filed Oct. 27, 2017 and is related to and claims the benefit of the filing dates of U.S. Provisional Patent Application Ser. No. 62/686,847 filed Jun. 19, 2018 and U.S. Provisional Patent Application Ser. No. 62/744,409 filed Oct. 11, 2018, the contents of which are incorporated herein by reference in their entireties.

FIELD OF THE INVENTION

This invention relates generally to a hose assembly for dispensing fluid and more particularly to a thermal controlled hose assembly for dispensing Diesel Exhaust Fluid (DEF).

BACKGROUND OF THE INVENTION

Diesel engines are well known and are used in trains, trucks and cars as an alternative to gas engines. A diesel engine is an internal combustion engine in which the ignition of diesel fuel is achieved by spraying the diesel fuel into a combustion chamber which contains air that is under such great pressure that the air becomes hot enough to ignite the diesel fuel being introduced. Diesel Exhaust Fluid or DEF is an aqueous urea solution (urea and deionized water in a 1:2 solution) that is used as a consumable in Selective Catalytic Reduction (SCR) in order to lower the Nitrogen Oxide (NOx) concentrations in the diesel exhaust emissions that are produced from a running diesel engine. These NOx gases (namely nitric oxide and nitrogen dioxide) are relevant to pollution and contribute to the formation of smog and acid rain, as well as negatively affecting the tropospheric ozone. The introduction of DEF is accomplished by storing the DEF in a DEF reservoir tank located on-board the vehicle and injecting the DEF into the hot exhaust stream via a metering system to control certain emissions. Specifically, the DEF interacts with the diesel exhaust to achieve an overall reduction in the emission of NOx.

The DEF operates by being introduced into the exhaust of the diesel engine, wherein inside the exhaust pipe, the DEF vaporizes and decomposes into ammonia and carbon dioxide. Those two compounds then react with oxygen and detrimental nitrogen oxides inside the vehicle's selective catalytic reduction (SCR) catalyst. This produces three benign tailpipe gases: nitrogen, water vapor, and carbon dioxide, thereby achieving an environmentally friendlier exhaust. DEF has been proven to be an economical, safe and efficient answer to reducing engine emissions and increasing vehicle mileage ratings. In fact, over the road Tier IV trucks and diesel-powered cars are required to use DEF to decrease engine emissions via SCR systems installed on the engines. If a diesel vehicle runs out of DEF, the vehicle is configured to prevent the diesel engine from starting and being operated.

To accommodate on-board storage of DEF, fuel stations are offering DEF to consumers via a DEF dispensing system having a DEF pump which dispenses DEF via a DEF dispensing nozzle (similar to a diesel fuel nozzle), in which the DEF is administered at pumps similarly to diesel fuel, where the DEF pumps are often located adjacent to the diesel fuel pumps so that the vehicle operator can fill up on both without having to move the vehicle. Unfortunately, however after the DEF has been dispensed and the nozzle replaced into its holder, there typically remains some DEF within dispensing nozzle and/or the dispensing hose. This is undesirable because the freezing point of DEF is about 12° F. and as such, when the outside temperature reaches or drops below 12° F., some of the DEF contained within the DEF dispensing system freezes and prevents the DEF from being dispensed. This is further undesirable because the vehicle engines are configured to prevent engine operation without DEF and thus, cannot be operated without DEF due to government requirements. In fact, most diesel engines are programmed to prevent the engine from being started if there is no DEF stored within the vehicle for introduction into the exhaust.

SUMMARY OF THE INVENTION

A thermal controlled hose assembly is provided, in accordance with one embodiment of the invention, and includes a hose, wherein the hose defines a hose cavity and wherein the hose is connected to the adapter such that the hose cavity is configured to be in flow communication with a fluid source. The thermal controlled hose assembly further includes a nozzle, wherein the nozzle includes an inlet port and an outlet port and defines a fluid flow channel which communicates the inlet port with the outlet port, and wherein the nozzle is connected with the hose such that the fluid flow channel is in flow communication with the hose cavity and a heating element, wherein the heating element is configured to be in contact with at least a portion of at least one of the hose and the nozzle.

A thermal controlled hose assembly is provided, in accordance with one embodiment of the invention and includes an adapter, wherein the adapter defines an adapter cavity and wherein the adapter is configured to receive a DEF fluid within the adapter cavity. The thermal controlled hose assembly further includes a hose, wherein the hose defines a hose cavity and wherein the hose is connected to the adapter such that the hose cavity is in flow communication with the adapter cavity, a nozzle, wherein the nozzle includes an inlet port and an outlet port and defines a fluid flow channel which communicates the inlet port with the outlet port, and wherein the nozzle is connected with the hose such that the fluid flow channel is in flow communication with the hose cavity and a heating system, wherein the heating system includes a heating element which is configured to be in contact with at least a portion of at least one of the adapter, the hose and the nozzle.

In accordance with one embodiment of the invention, a method for controlling a thermal controlled hose assembly for dispensing DEF fluid is provided and includes associating a thermal controlled hose assembly with a DEF fluid dispensing system, wherein the thermal controlled hose assembly includes a controllable heating element associated with at least one of a DEF dispensing nozzle, a DEF dispensing hose and an adapter, determining the outside temperature proximate the DEF fluid dispensing system and if the outside temperature is approximately about 12° F. or lower, then causing the controllable heating element to emit heat.

BRIEF DESCRIPTION OF THE DRAWINGS

The foregoing and other features and advantages of the present invention will be more fully understood from the following detailed description of illustrative embodiments, taken in conjunction with the accompanying drawings in which like elements are numbered alike.

DETAILED DESCRIPTION OF THE INVENTION

As disclosed herein with regards to an exemplary embodiment, a unique and novel thermally controllable hose assembly (HH) is provided and allows for the dispensing of DEF in cold climates where temperatures can fall below 12° F. The present invention may be used in a wide variety of DEF (and other fluid) dispensing applications, such as for example, job site dispensing trucks for dispensing DEF to construction equipment operated by diesel engines, diesel equipped re-fueling stations such as large truck stops on major highways and any other diesel dispensing station that also offers DEF dispensing in climates that drop below 12° F. and down to −40° F. It should be appreciated that the present invention may be used for dispensing any type of fluid as desired, such as DEF, diesel fuel, gasoline, aviation fuel, water, etc. . . . . . It should also be appreciated that the present invention may be rated and may meet applicable standards per US electrical code CLASS 1. Division 1—Explosion proof. It should also be appreciated that the present invention allows for year-round dispension of DEF (or other fluid) without interruption due to outside temperature. When the outside temperature is above about 12° F.±5° F. (and/or some other predefined temperature), the DEF will not freeze and thus will continue to be dispensed normally. As such the present invention will not be energized. However, once the outside temperature falls below about 12° F.±5° F. (and/or some other predefined temperature), the present invention may be energized to prevent the DEF from freezing and thus allowing for continuous dispension. For other fluids, other temperature thresholds may be used.

Figure 1A:
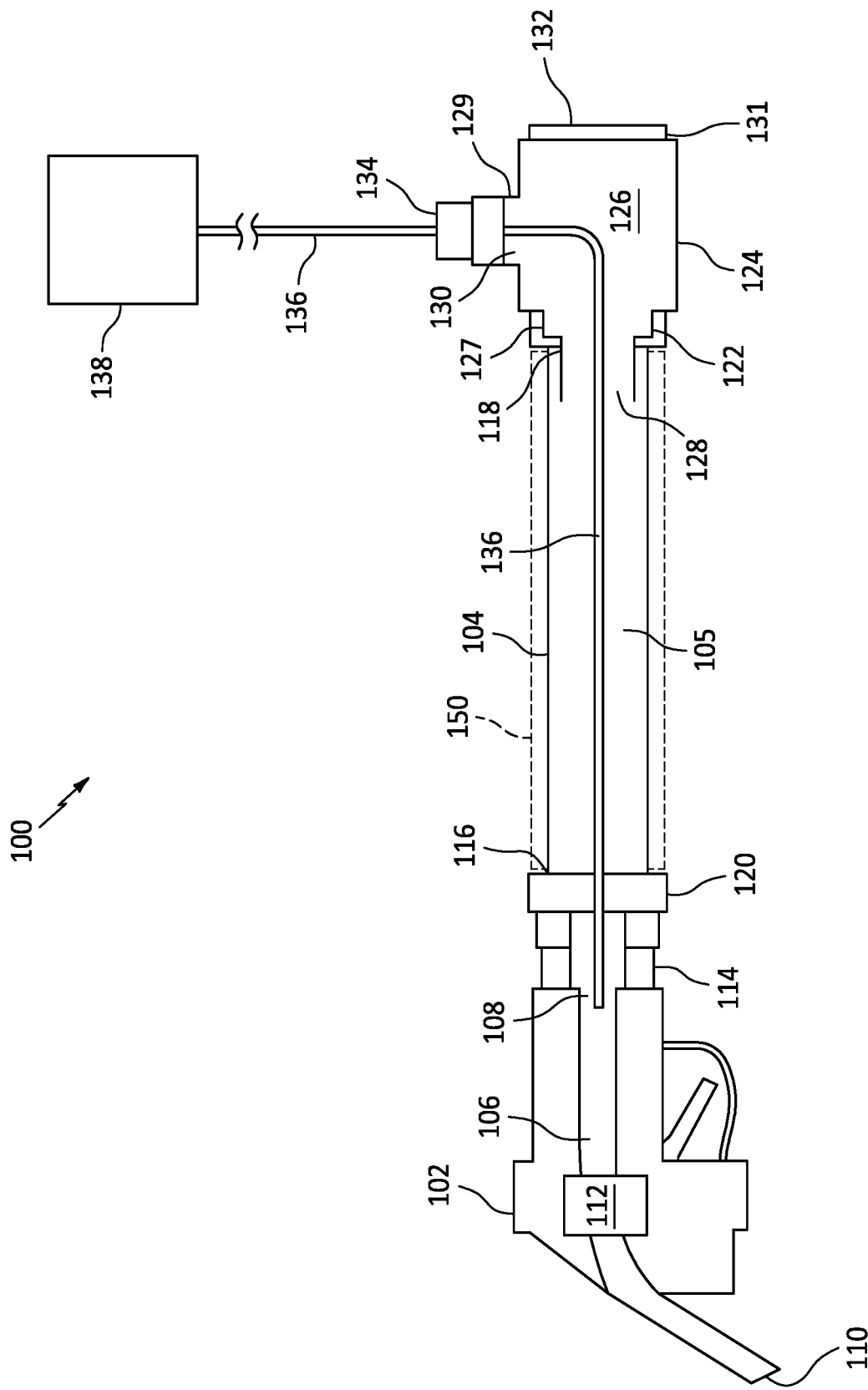
FIG. 1A illustrates a side sectional view of a thermal controlled hose assembly connected to a fluid dispensing nozzle, in accordance with one embodiment of the invention.

Referring to FIG. 1, one embodiment of a thermal controlled hose assembly 100 is provided and includes a nozzle 102 and a hose 104 which defines a hose cavity 105, wherein the nozzle 102 defines a fluid flow channel 106 and includes an inlet port 108 communicated with an outlet port 110 via the fluid flow channel 106. A flow control means 112 (such as a flow control valve) may be provided, wherein the flow control means 112 is communicated with the fluid flow channel 106 to control the volume and/or flow rate of the fluid flowing through fluid flow channel 106 and being dispensed out of the outlet port 110. A swivel joint 114 (which may be configured as male/or female) and/or safety break coupling may be included and is associated with the nozzle 102 to be communicated with the inlet port 108 such that fluid flowing into the swivel joint 114 flows through the swivel joint 114 and into the fluid flow channel 106. The hose 104 includes a first hose end 116 and a second hose end 118, wherein the first hose end 116 is connected to the swivel joint 114 via any device and/or means suitable to the desired end purpose, such as a first British Standard Parallel Pipe (BSPP) pipe fitting 120. In this embodiment, the first pipe fitting 120 is shown as being configured as a female pipe fitting. However, it is contemplated that in other embodiments the first pipe fitting 120 may be configured as a male pipe fitting 120. Furthermore, the hose 104 may also include a second BSPP pipe fitting 122 (here configured as female) associated with the second hose end 118 of the hose 104. In this embodiment, the second pipe fitting 122 is shown as being configured as a female pipe fitting. However, it is contemplated that in other embodiments the second pipe fitting 122 may be configured as a male pipe fitting 122. It should be appreciated that the first hose end 116 is communicated with the second hose end 118 via the hose cavity 105. When assembled together, the hose cavity 105 is communicated with the inlet port 108.

In one embodiment, an adapter 124 (in this embodiment a "T" style adapter) may be provided and is connected to the second hose end 118 of hose 104 via the second BSPP pipe fitting 122. It should be appreciated that although a 'T' style adapter is shown, it is contemplated that any type of adapter 124 suitable to the desired end purpose may be used. The adapter 124 defines an adapter cavity 126 and includes a first adapter end 127 defining a first adapter opening 128, a second adapter end 129 defining a second adapter opening 130 and a third adapter end 131 defining a third adapter opening 132, wherein each of the first adapter opening 128, second adapter opening 130 and third adapter opening 132 are communicated with the adapter cavity 126. The adapter 124 further includes an adapter opening cover 134 associated with the adapter 124 to cover and seal the second adapter opening 130. It should be appreciated that when the adapter 124 is associated with the second hose end 118, the adapter cavity 126 is communicated with the hose cavity 105 via the first adapter opening 128.

The thermal controlled hose assembly 100 may further include a heating element or cable 136 which may be introduced into the adapter cavity 126 via the adapter opening cover 134 which is configured to allow the heating cable 136 to be communicated with the adapter cavity 126 while still sealing the second adapter opening 130. The heating cable 136 is associated with the thermal controlled hose assembly 100 to be located within the adapter cavity 126, the hose cavity 105 and/or a portion of the fluid flow channel 106 such that when fluid is contained within the adapter cavity 126, the hose cavity 105 and/or the fluid flow channel 106, the heating cable 136 is located within the fluid and/or in contact with the fluid.

It should be appreciated that, in one embodiment, the adapter 124 may be an aluminum Tee style adapter wherein the first adapter end 127 is threadingly associated with the second hose end 118 via the second BSPP pipe fitting 120 which may be a 1" BSPP female fitting. The third adapter end 131 may be connected to a hard piping system which is typically located within the overhead mezzanine of a DEF dispensing service station. Additionally, the second adapter end 129 may include the adapter opening cover 134 and may be a Female NPT with a liquid tight compression seal to accommodate a male 1" NPT fitting of a waterproof/leakproof self limiting cable transition exit fitting. It should be further appreciated that the heating cable 136 may be electrically connected to a power source 138, where the electrical connection may be accomplished in the service station overhead mezzanine or other suitable arrangement. It is contemplated that the adapter 124 may be constructed from any material suitable to the desired end purpose, such as aluminum and/or a cold weather rated thermoplastic.

Figure 1B:
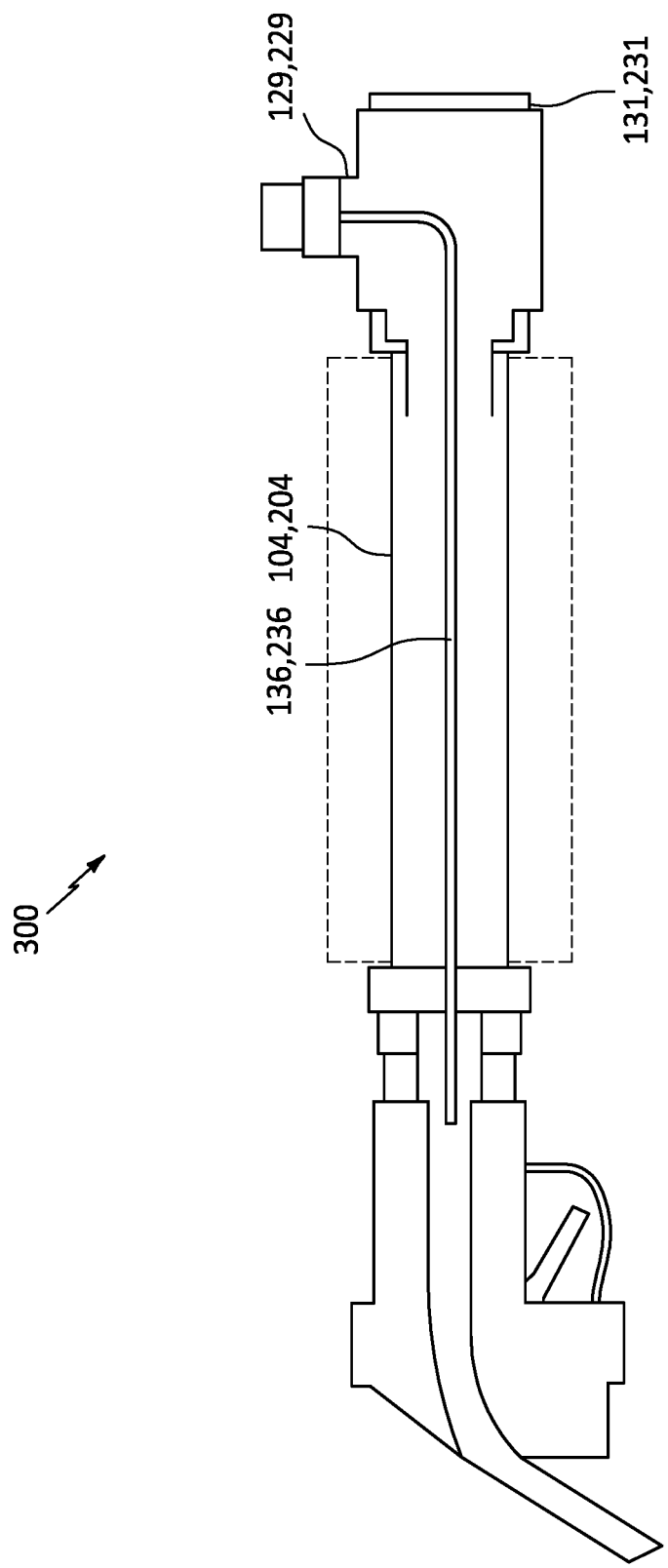
FIG. 1B illustrates a side sectional view of a thermal controlled hose assembly connected to a fluid dispensing nozzle, in accordance with another embodiment of the invention.

Referring to FIG. 1B, in yet another embodiment, it is contemplated that the heating cable 136, 236 of a thermal controlled hose assembly 400 may be configured to enter the hose 104, 204 via the third adapter end 131, 231 and/or the fluid may be introduced into the hose 104, 204 via the second adapter end 129, 229. This configuration may advantageously put less strain on the heating cable 136, 236.

Figure 2:
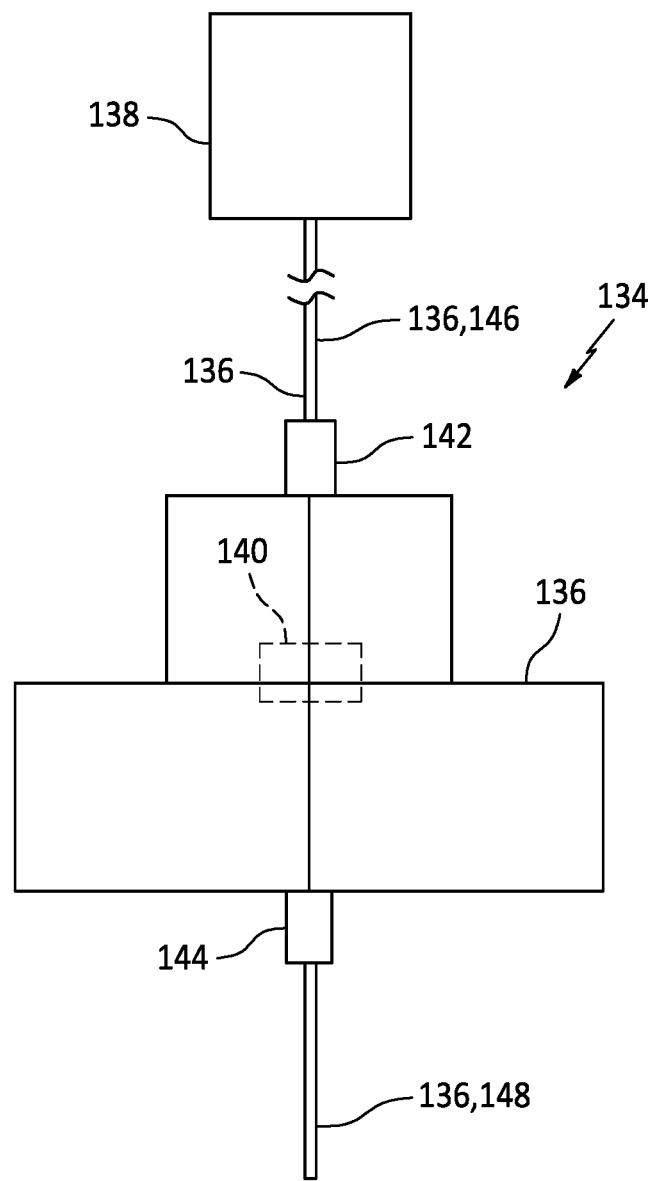
FIG. 2 illustrates a side view of an adapter cover opening for a fluid dispensing nozzle for use with a thermal controlled hose assembly, in accordance with another embodiment of the invention.

Referring to FIG. 2, in accordance with one embodiment, the adapter opening cover 134 may be configured to include an electrical connection device 140 having a first electrical connector 142 and a second electrical connector 144. In this embodiment, the heating cable 136 may be divided into a first electrical cable section 146 and a second electrical cable section 148, wherein the first electrical cable section 146 extends between the power source 138 and the first electrical connector 142, and wherein the second electrical cable section 148 is connected to the second electrical connector 144 and extends into the adapter cavity 126, the hose cavity 105 and/or a portion of the fluid flow channel 106.

In accordance with one embodiment of the present invention, at a standard service station the thermal controlled hose assembly 100 may be included in an industry term "3-1&1" configuration with three gasoline grades, diesel fuel and also a DEF dispenser in a familiar "hanging hose" configuration. It is contemplated that the heating element or cable 136 may be a self limiting heating cable 136 (or non-self limiting but controllable heating cable) which may be configured to automatically turn itself off above freezing temperatures and on below 32 F where the heating cable 136 may control its operation up to 8 watts per ft to prevent freezing down to −40 F. The hose 104 may be an 18 foot long (the hose 104 can be virtually any length as desired, such as for example 210 feet) DEF specific hose such as, for example a Flextral PE60-100 1 inch TruBlue DEF Hose 210 PSI Max ISO-22241, wherein the hose 104 may have a crimped 1" Female BSPP fitting at each end 116, 118.

As mentioned above, the heating cable 136 may be an 8 watt per foot (the heating cable 136 may be configured to operate at any watt per foot) self limiting heating cable 136 which may be installed inside of the hose assembly 100 and which may extend all the way past the first and second BSPP fittings 120, 122 and end within the fluid flow channel 106 of the DEF dispensing nozzle 102. The self limiting cable 136 may be electrically terminated with a waterproof heavy duty rubber cover (which may be about. 2.75 inches in length and 0.4 inches wide) and which may have a crimped collar for permanent retention to the self-limiting heating cable 136. Additionally, it is contemplated that other types and/or methods of terminating the heating cable 136 suitable to the desired end purpose may be used.

It should be appreciated that in one embodiment, the thermal controlled hose assembly 100 may also include external insulation 150 as desired. For example, the thermal controlled hose assembly 100 (or the hose 104) may be wrapped in an insulating tape such as (AP/Armaflex black ⅛" thick, 2" wide closed cell, mold resistant elastomeric thermal insulation tape). Additionally, the thermal controlled hose assembly 100 may be encapsulated within a 2" Poly-Urethane hose rated to −65 F, wherein the hose may be configured to offer superior abrasion resistance and/or may be UV stabilized for outdoor use. Moreover, the hose may be blue in color with a blue wear strip making a connection with DEF (this is sometimes called ADBlue etc). Additionally, the 2" Poly-Urethane hose may have a custom black low temperature rated 3" long thermoplastic end cap/coupling covering the end of the blue hose on the first hose end 116.

It should also be appreciated that the hose 104 may be a heavy duty DEF hose 104 (i.e. for example having a 1" ID and 1.5" OD manufactured by Novaflex Group having the part number is 4203BE rated at 200 psi Working Pressure). This heavy duty industrial hose may have a ¼" wall thickness that retains heat that allows the hose to have an internal self limiting heating element (i.e. for example with heat density of 5 watt per ft). In this embodiment, although the live swivel and/or safety break coupling between the hose and dispensing nozzle may need to be insulated, no insulation or urethane jacket may be required, and no plastic end fitting may be required. It is contemplated that if the live swivel and/or safety break coupling are, in fact broken, then power to the heating cable 136 will be terminated.

Figure 3:
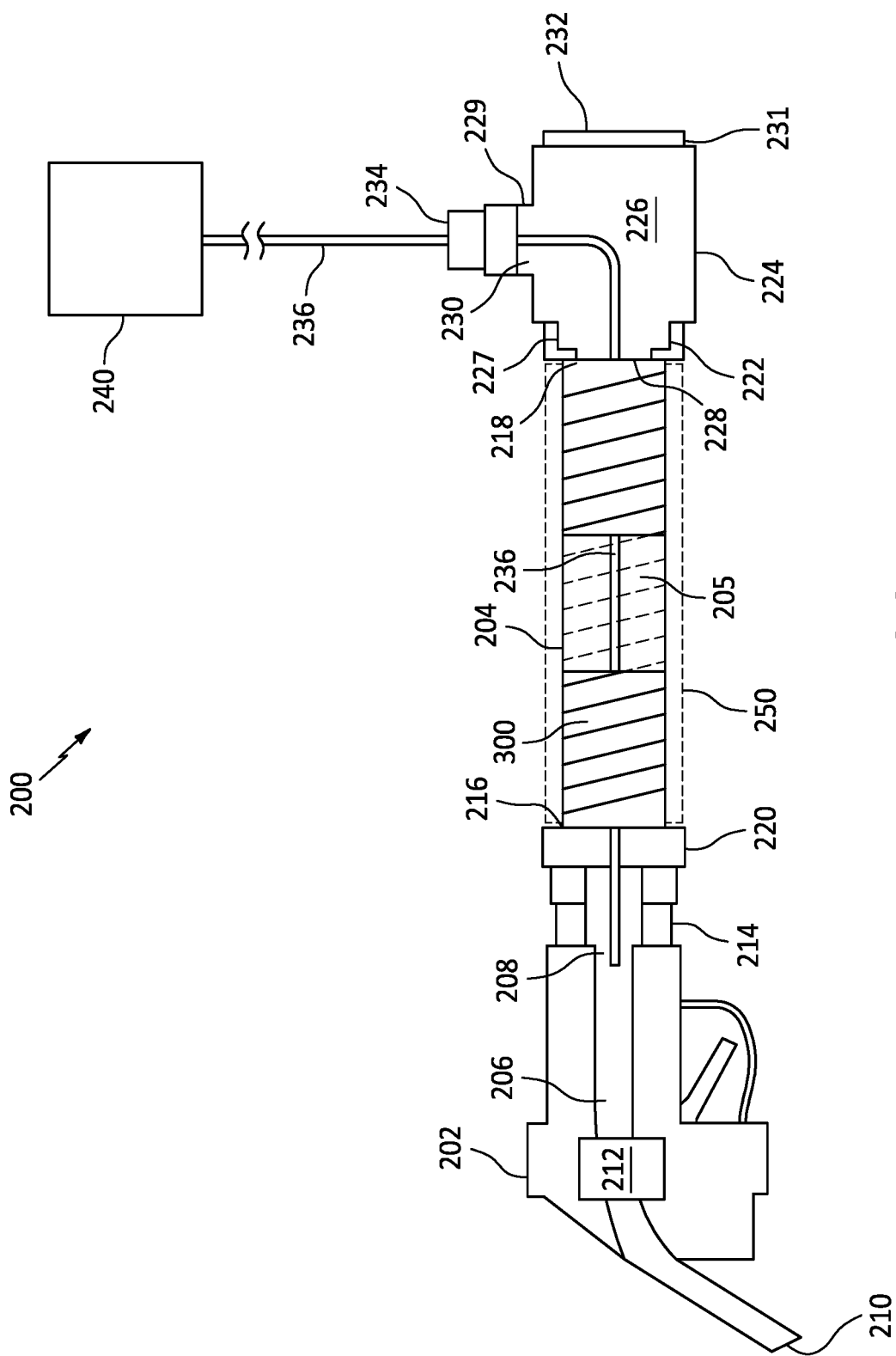
FIG. 3 illustrates a side sectional view of a thermal controlled hose assembly connected to a fluid dispensing nozzle and having an exterior heating element, in accordance with another embodiment of the invention.
Figure 4:
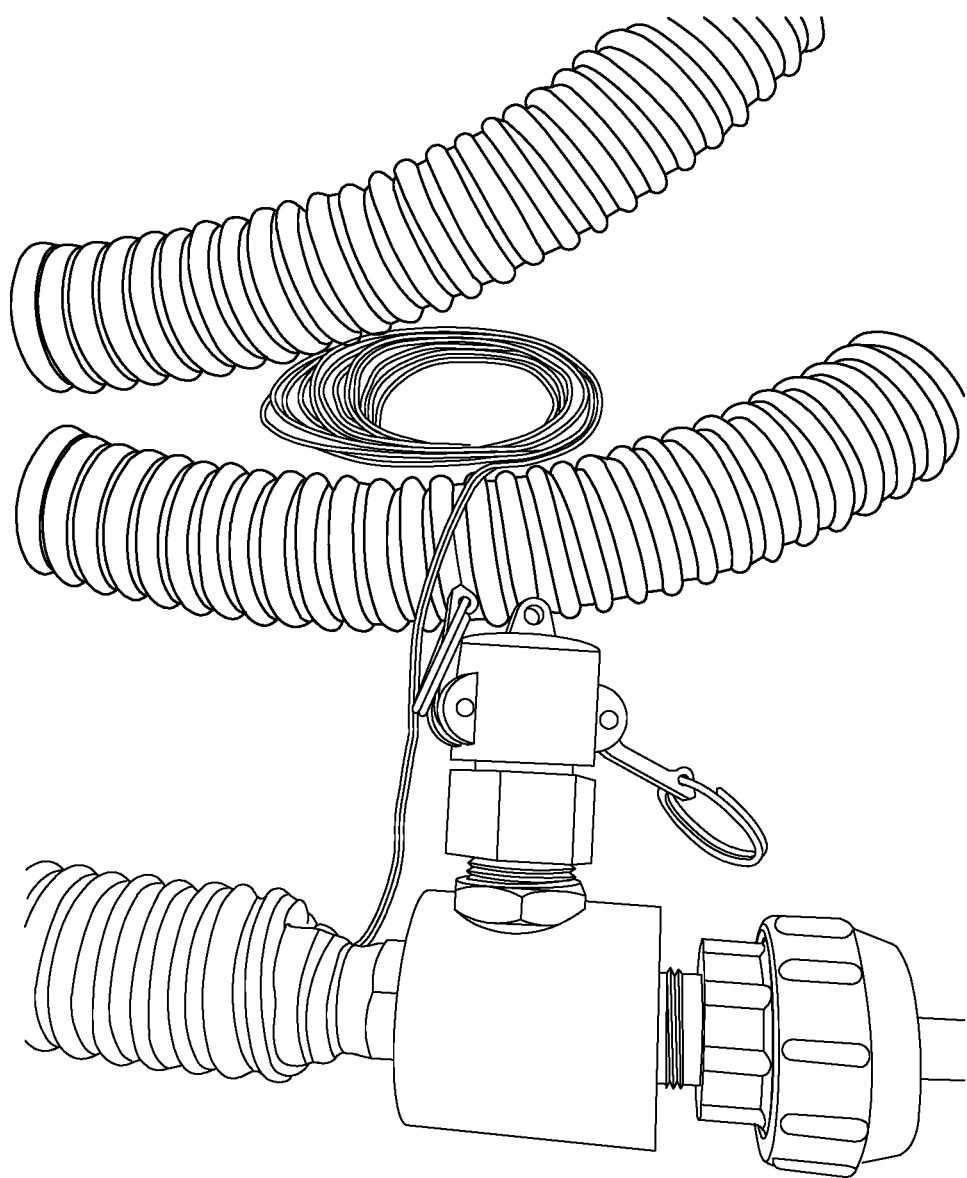
FIG. 4 illustrates a side view of one end a thermal controlled hose assembly showing a power cable for powering the exterior heating element of FIG. 3, in accordance with one embodiment of the invention.
Figure 5:
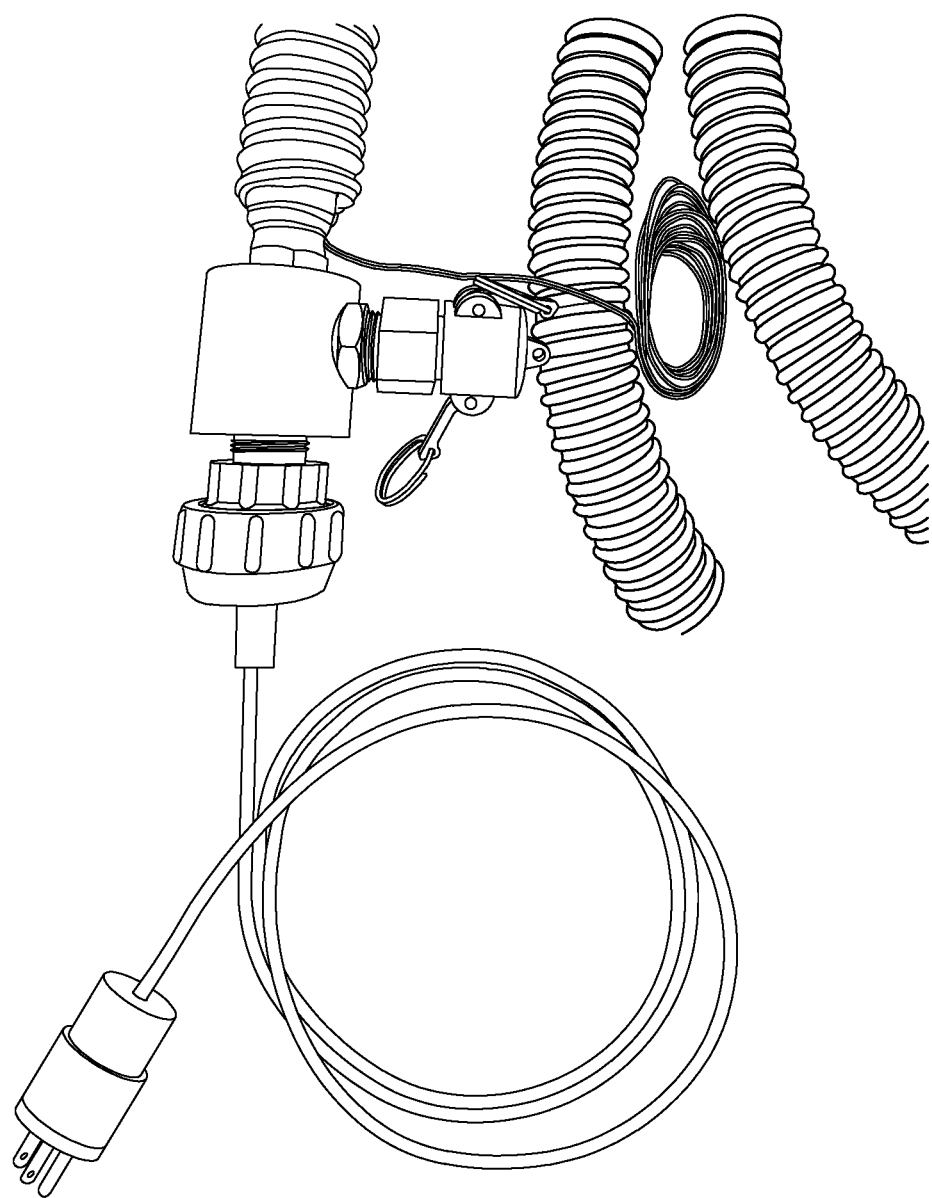
FIG. 5 illustrates a side view of one end a thermal controlled hose assembly showing a power cable for powering the heating element cable of FIG. 2, in accordance with one embodiment of the invention
Figure 6:
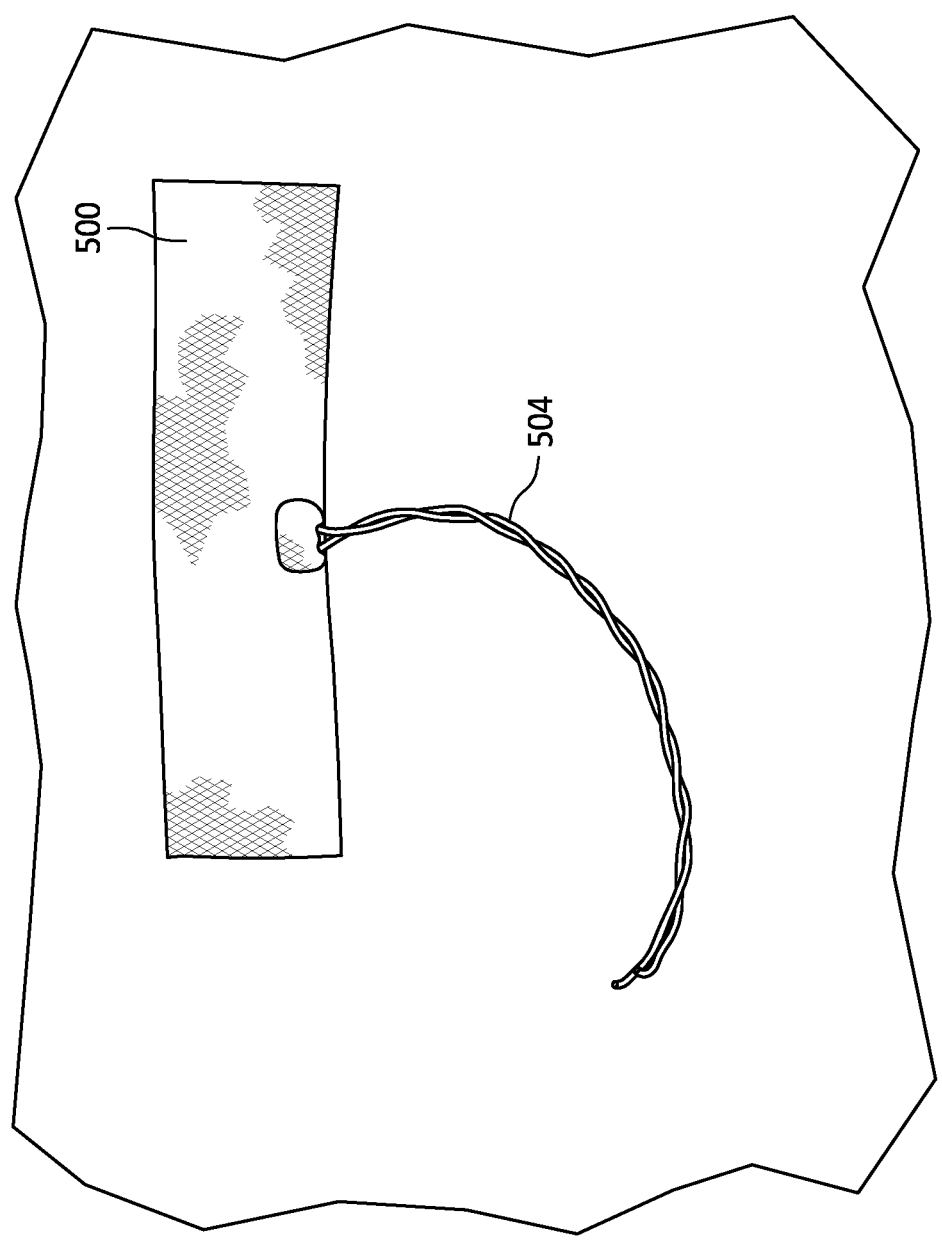
FIG. 6 illustrates a top down view of a flexible heating element for use with the thermal controlled hose assembly of FIG. 3, in accordance with one embodiment of the invention.
Figure 7A:
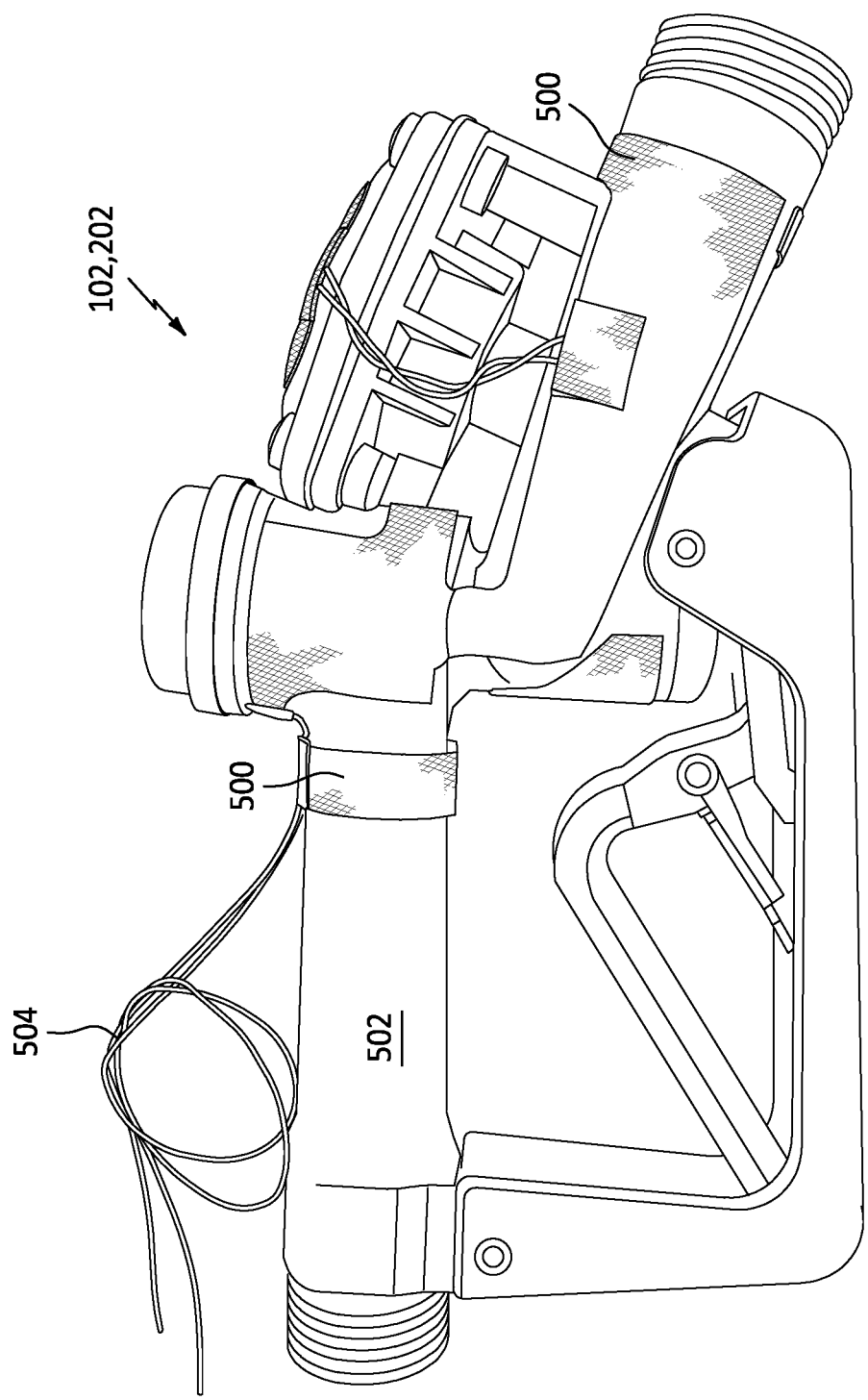
FIG. 7A illustrates a side view of a fluid dispensing nozzle for a thermal controlled hose assembly without the rubber cover showing the flexible heating element of FIG. 6 associated with portions of the nozzle surface, in accordance with one embodiment of the invention.
Figure 7B:
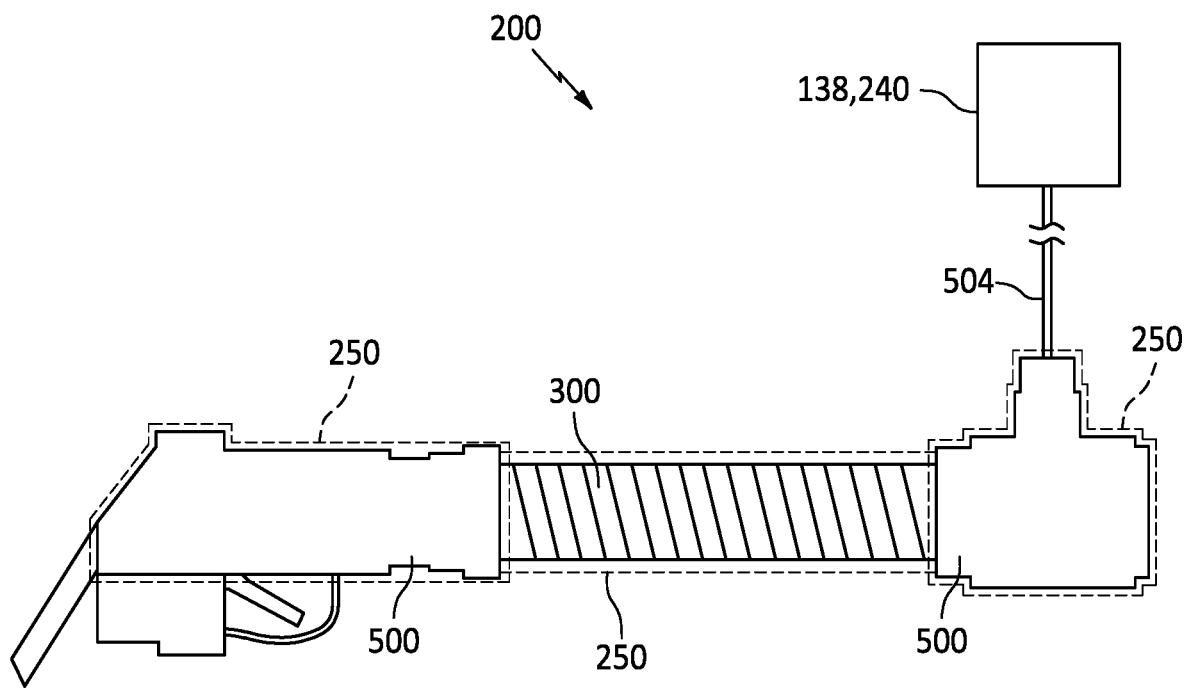
FIG. 7B illustrates the flexible heating element of FIG. 6 covering the nozzle structure and the adapter, in accordance with one embodiment of the invention.
Figure 7C:
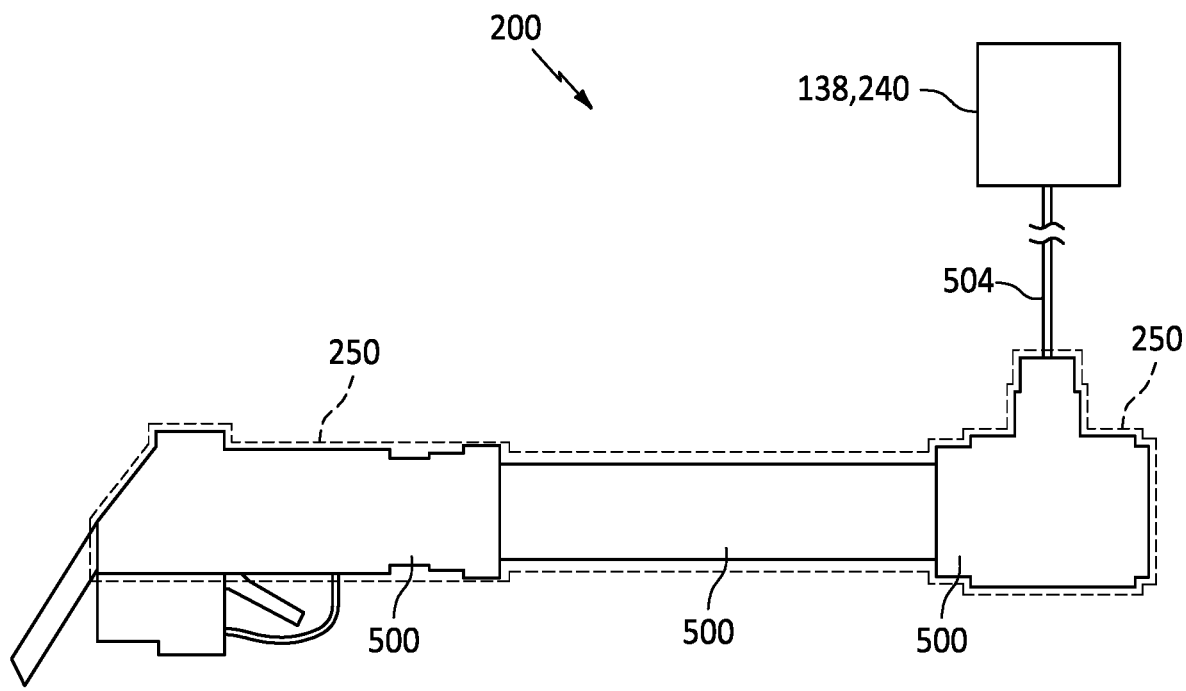
FIG. 7C illustrates the flexible heating element of FIG. 6 covering the nozzle structure and the adapter, in accordance with one embodiment of the invention.
Figure 8:
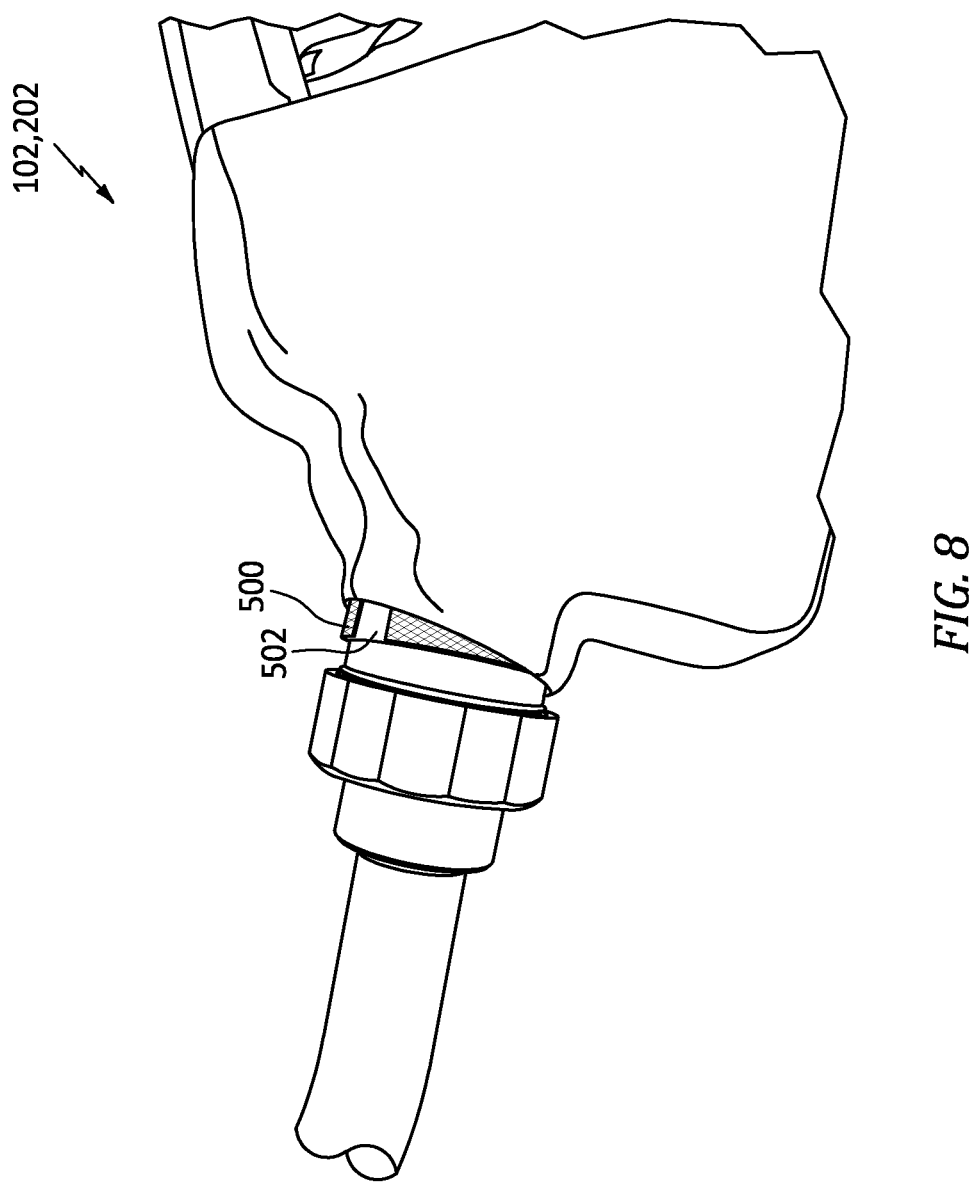
FIG. 8 illustrates a side view of the fluid dispensing nozzle of FIG. 6 with a rubber cover showing a flexible heating element on the nozzle surface and under the rubber covering, in accordance with one embodiment of the invention.
Figure 9:
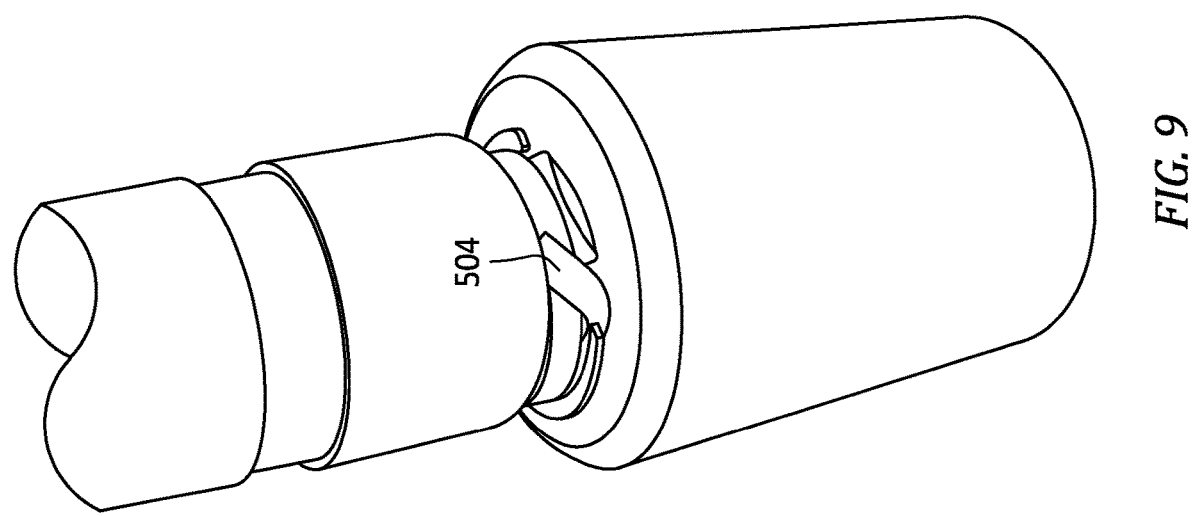
FIG. 9 illustrates a side view of the connection between the thermal controlled hose assembly and the fluid dispensing nozzle showing a power wire to power the flexible heating element of FIG. 6, in accordance with one embodiment of the invention.
Figure 10:
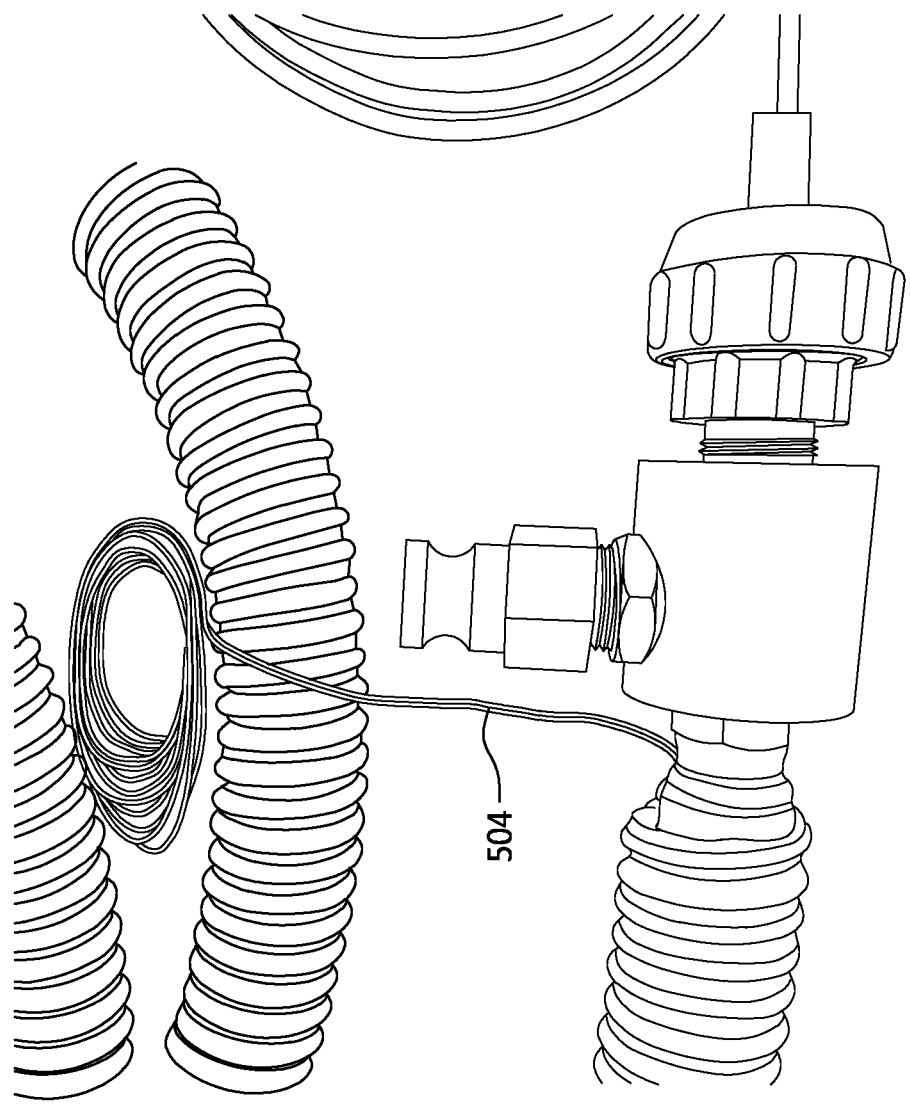
FIG. 10 illustrates a side view of the adapter end of a thermal controlled hose assembly, in accordance with one embodiment of the invention.
Figure 11:
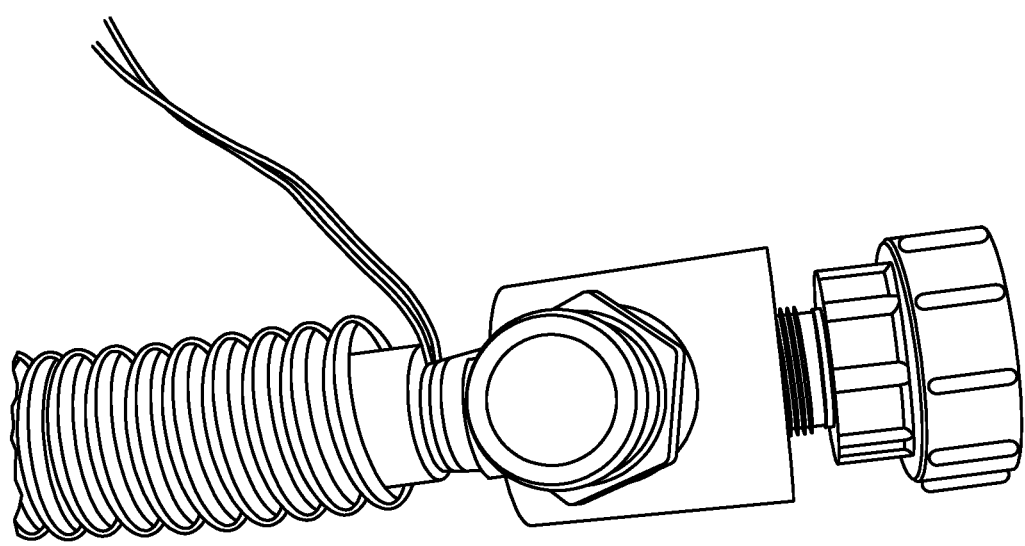
FIG. 11 illustrates a top view of the adapter end of a thermal controlled hose assembly, in accordance with one embodiment of the invention.

Referring to FIG. 3, another embodiment of a thermal controlled hose assembly 200 is provided and includes a nozzle 202 and a hose 204 which defines a hose cavity 205, wherein the nozzle 202 defines a fluid flow channel 206 and includes an inlet port 208 communicated with an outlet port 210 via the fluid flow channel 206. A flow control means 212 is provided, wherein the flow control means 212 is communicated with the fluid flow channel 206 to control the volume and/or flow rate of the fluid flowing through the fluid flow channel 206 and being dispensed out of the outlet port 210. A swivel joint 214 (configured as male) and/or safety break coupling may be included and may be associated with the nozzle 202 to be communicated with the inlet port 208 such that fluid flowing into the swivel joint 214 flows through the swivel joint 214 and into the fluid flow channel 206. The hose 204 includes a first hose end 216 and a second hose end 218, wherein the first hose end 216 is connected to the swivel joint 214 via a first BSPP pipe fitting 220 (configured as female).

In this embodiment, the first pipe fitting 220 is shown as being configured as a female pipe fitting. However, it is contemplated that in other embodiments the first pipe fitting 220 may be configured as a male pipe fitting 220. Furthermore, the hose 204 also includes a second BSPP pipe fitting 222 (configured as female) associated with the second hose end 218 of the hose 204. In this embodiment, the second pipe fitting 222 is shown as being configured as a female pipe fitting. However, it is contemplated that in other embodiments the second pipe fitting 222 may be configured as a male pipe fitting 222. The first hose end 216 is communicated with the second hose end 218 via the hose cavity 205. When assembled together, the hose cavity 205 is communicated with the inlet port 208.

An adapter 224 (in this embodiment, as above shown as a "T" style adapter) is provided and is connected to the second hose end 218 of hose 204 via the second BSPP pipe fitting 222. The adapter 224 defines an adapter cavity 226 and includes a first adapter end 227 defining a first adapter opening 228, a second adapter end 229 defining a second adapter opening 230 and a third adapter end 231 defining a third adapter opening 232, wherein each of the first adapter opening 228, second adapter opening 230 and third adapter opening 232 are communicated with the adapter cavity 226. The adapter 224 further includes an adapter opening cover 234 associated with the adapter 224 to cover and seal the second adapter opening 230.

It should be appreciated that when the adapter 224 is associated with the second hose end 218, the adapter cavity 226 is communicated with the hose cavity 205 via the first adapter opening 228. The thermal controlled hose assembly 200 further includes a heating cable 236 which may be introduced into the adapter cavity 226 via the adapter opening cover 234 which is configured to allow the heating cable 236 to be communicated with the adapter cavity 226 while still sealing the second adapter opening 230. The heating cable 236 may be a self-limiting heating element and may be associated with the thermal controlled hose assembly 200 to be located within the adapter cavity 226, the hose cavity 205 and/or a portion of the fluid flow channel 206 such that when fluid is contained within the adapter cavity 226, the hose cavity 205 and the fluid flow channel 206, the heating cable 236 is located within and in contact with the fluid. It should be appreciated that the heating cable 236 may be electrically connected to a power source 240, where the electrical connection may be accomplished in the service station overhead mezzanine (or other suitable location). It is contemplated that the adapter 224 may be constructed from any material suitable to the desired end purpose, such as aluminum and/or a cold weather rated thermoplastic.

In one embodiment, the hose assembly 200 may include an exterior heater element 300 which may be wrapped around the exterior of the hose 204, wherein the exterior heater element 300 may have a power density as desired, such as for example, a 5 watt per foot, 3 watt per foot, an 8 watt per foot, etc. . . . . In one embodiment, the open end of the exterior heater element 300 may be located on the mezzanine connection end (i.e. adapter 224) of the hose 204 with approximately 56' (more or less) of exterior heating element 300 spirally wound around the hose 204 between the first hose end 216 (i.e. the end of the hose nozzle dispensing end) and the second hose end 218. It is contemplated that in some embodiments, the exterior heating element 300 may also be configured to cover all or a portion of the adapter 224. In one embodiment, the exterior heating element 300 may be secured with 1.5" wide flexible Silicone tape and the hose 204/exterior heating element 300 combination may be covered with an insulating urethane hose cover 250 (as used in previous description).

Additionally, in one embodiment, the invention may also retain a black low temp rated plastic also as previously described and the live swivel and/or safety break coupling that connects the heated hose 204 to the dispensing nozzle 216 may be covered with insulation as desired to be rated to not have the DEF fluid freeze to −40 F. Referring to FIGS. 4-12, in still yet another embodiment, a flexible heating element 500 may be used in place of and/or in addition to the heating cable 136, 236 and/or exterior heating element 300. The flexible heating element 500 may be located on the external (and/or internal) portion of the hose 104, 204 along the entire length of the hose 104, 204 or only in predetermined locations along the length of the hose 104, 204.

Referring to FIG. 7A-11, the nozzle 102, 202 may include a nozzle structure 502 which defines the fluid flow channel 106, 206, wherein the flexible heating element 500 may be located on all or only a portion of the external surface of the nozzle structure 502. It is contemplated that the flexible heating element 500 may be associated with the nozzle structure 502 via any method or device suitable to the desired end purpose, such as being affixed to the nozzle structure 502 via an adhesive and/or a wrap fashion and/or the flexible heating element 500 may be 'fit' over the external surface of the nozzle structure 502 in a 'glove' like fashion. It should be appreciated that the flexible heating element 500 may include a power wire 504 that is connected to a power source 138, 240 wherein the power wire 504 may extend along the length of the hose 104, 204 and may be located between the external portion of the hose 104, 204 and any external insulation 150, 250. Moreover, it should also be appreciated that the flexible heating element 500 may be located on any 'wetted' and/or 'non-wetted' (internal and/or external) surface, such as for example under the rubber cover on the nozzle structure 502. FIG. 7B illustrates the flexible heating element 500 covering the nozzle structure 502 and the adapter 124, 224, in accordance with one embodiment of the invention. FIG. 7C illustrates the flexible heating element 500 covering the nozzle structure 502, the hose 104, 204 and the adapter 124, 224, in accordance with another embodiment of the invention.

It should be appreciated that, in one embodiment, the flexible heating element 500 may be located on the nozzle structure 502 to be proximate the fluid flow channel 106, 206. This allows the heat from the flexible heating element 500 to be transferred to fluid contained within the fluid flow channel 106, 206. It should be appreciated that in another embodiment, that the flexible heating element 500 may be located on the adapter 124, 224 to be proximate the adapter cavity 126, 226. This allows the heat from the flexible heating element 500 to be transferred to the fluid contained within the adapter cavity 126, 226. It should be appreciated that in still yet another embodiment, that the flexible heating element 500 may be associated with the hose 104, 204 to be proximate the hose cavity 105, 205. This allows the heat from the flexible heating element 500 to be transferred to the fluid contained within the hose cavity 105, 205.

It should be appreciated that the flexible heating element may be any flexible heating element suitable to the desired end purpose, such as a silicone-based heating element configured for 57 watts, 24-volt operation from Birk Manufacturing. It is contemplated that other power and operating characteristics may be used as desired to increase and/or decrease power consumption as needed.

It is contemplated that the power to the heating cable 136, 236, the exterior heating element 300 and/or the flexible heating element 500 may be controlled via a processing device (not shown) that is configured to adjust the power to the heating cable 136, 236, the flexible heating element 500 and/or the exterior heater element 300 in response to external temperature and/or some other predetermined characteristic. For example, if the external temperature falls below a first temperature, the processor may turn on one or all of the heating cables 136, 236, the flexible heating element 500 and/or the exterior heater element 300. Additionally, the processor may control the power to one or all of the heating elements 136, 236, the flexible heating element 500 and/or the exterior heater element 300 together and/or individually, adding more power during extreme external temperatures and less power during less extreme external temperatures. Moreover, in the situation where a location has multiple dispensers each having a heating cable 136, 236, a flexible heating element 500 and/or an exterior heater element 300, the processor may control the power to each of the heating cables 136, 236, a flexible heating element 500 and/or exterior heater element 300 together or singly for each of the dispensers, turning some on and others off.

Figure 12:
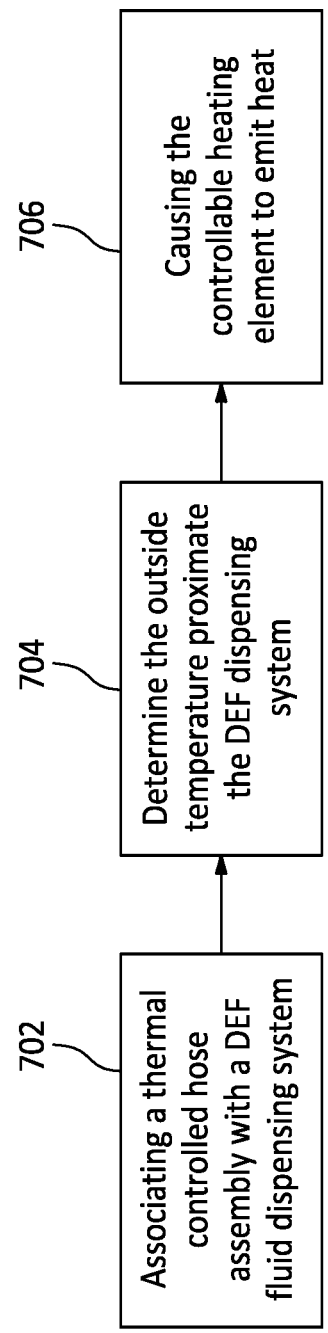
FIG. 12 is an operational block diagram illustrating a method for controlling the thermal controlled hose assembly, in accordance with one embodiment of the invention.

Referring to FIG. 12, an operational block diagram illustrating one embodiment of a method 700 for controlling a thermal controlled hose assembly 100, 200 is shown and includes associating a thermal controlled hose assembly 100, 200 with a DEF fluid dispensing system, as shown in operational block 702. It should be appreciated that, as discussed herein, the thermal controlled hose assembly includes a controllable heating element associated with at least one of a DEF dispensing nozzle, a DEF dispensing hose and an adapter. The method 700 further includes determining the outside temperature proximate the DEF fluid dispensing system, as shown in operational block 704 and, if the outside temperature is approximately about 12° F. or lower, then causing the controllable heating element to emit heat, as shown in operational block 706. It should be appreciated that the heating element 136, 236, 300, 500 may be controlled responsive to the outside temperature proximate the DEF fluid dispensing system such that the heating element automatically turns on and/or adjusts its heat output responsive to the outside air temperature. Accordingly, when the outside temperature is approximately about 12° F. or higher, the thermal controlled hose assembly 100, 200 would cause the heating element 136, 236, 300, 500 cease operating.

Moreover, while the invention has been described with reference to an exemplary embodiment, it will be understood by those skilled in the art that various changes, omissions and/or additions may be made and equivalents may be substituted for elements thereof without departing from the spirit and scope of the invention. In addition, the elements and/or characteristics of the disclosed embodiments may be combined in whole or in part and/or many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

We claim:

1. A thermal controlled hose assembly, the hose assembly comprising:
   a hose, wherein the hose defines a hose cavity and wherein the hose is connected to an adapter such that the hose cavity is configured to be in flow communication with a fluid source;
   a nozzle, wherein the nozzle includes a nozzle structure having a nozzle structure external surface and defining an inlet port and an outlet port and defines a fluid flow channel which communicates the inlet port with the outlet port, and wherein the nozzle is connected with the hose such that the fluid flow channel is in flow communication with the hose cavity; and
   an flexible heating element including a power wire, wherein the flexible electric heating element is configured to be in contact with at least a portion of the nozzle structure external surface.

2. The thermal controlled hose assembly of claim 1, further comprising an adapter, wherein the adapter defines an adapter cavity and wherein the adapter is configured to be in flow communication with the fluid source and receive a fluid within the adapter cavity from the fluid source.

3. The thermal controlled hose assembly of claim 2, wherein the hose is configured to be in flow communication with the fluid source via the adapter, such that the fluid flows through the adapter cavity, through the hose cavity, through the fluid flow channel and out of the outlet port.

4. The thermal controlled hose assembly of claim 1, wherein the electric heating element is configured to be in contact with a least a portion of the nozzle surface and wherein the electric heating element is configured such that heat from the electric heating element is transferred to fluid contained within the fluid flow channel.

5. The thermal controlled hose assembly of claim 1, wherein the electric heating element is configured to be in contact with a least a portion of the hose and wherein the electric heating element is configured such that heat from the electric heating element is transferred to fluid contained within the hose cavity.

6. The thermal controlled hose assembly of claim 2, wherein the electric heating element is configured to be in contact with a least a portion of the adapter and wherein the electric heating element is configured such that heat from the electric heating element is transferred to fluid contained within the adapter cavity.

7. The thermal controlled hose assembly of claim 1, further comprising a flow control means, wherein the flow control means is associated with the fluid flow channel to control the flow of a fluid flowing into the inlet port, through the fluid flow channel and out of the outlet port.

8. The thermal controlled hose assembly of claim 7, wherein the flow control means is a controllable valve, wherein the controllable valve is configured to control at least one of a volume and flow rate of the fluid flowing out of the outlet port.

9. The thermal controlled hose assembly of claim 1, wherein the electric heating element is configured to heat up when the external environment temperature falls below a predefined temperature.

10. The thermal controlled hose assembly of claim 9, wherein the predetermined temperature is above approximately 12° F.

11. A thermal controlled hose assembly, the hose assembly comprising:
- an adapter, wherein the adapter defines an adapter cavity and wherein the adapter is configured to receive a DEF fluid within the adapter cavity;
- a hose, wherein the hose defines a hose cavity and wherein the hose is connected to the adapter such that the hose cavity is in flow communication with the adapter cavity;
- a nozzle, wherein the nozzle includes a nozzle structure having a nozzle structure external surface and defining an inlet port and an outlet port and defines a fluid flow channel which communicates the inlet port with the outlet port, and wherein the nozzle is connected with the hose such that the fluid flow channel is in flow communication with the hose cavity; and
- a heating system, wherein the heating system includes a flexible electric heating element which is configured to be in contact with the nozzle structure external surface, wherein the flexible electric heating element includes a power wire.

12. The thermal controlled hose assembly of claim 11, wherein the adapter is configured to be in flow communication with a DEF fluid source.

13. The thermal controlled hose assembly of claim 12, wherein the hose is configured to be in flow communication with the DEF fluid source via the adapter, such that the DEF fluid flows through the adapter cavity, through the hose cavity, through the fluid flow channel and out of the outlet port.

14. The thermal controlled hose assembly of claim 11, wherein the electric heating element is configured to be in contact with a least a portion of the nozzle surface and wherein the electric heating element is configured such that heat from the electric heating element is transferred to the DEF fluid contained within the fluid flow channel.

15. The thermal controlled hose assembly of claim 11, wherein the heating element is configured to be in contact with a least a portion of the hose and wherein the electric heating element is configured such that heat from the heating element is transferred to the DEF fluid contained within the hose cavity.

16. The thermal controlled hose assembly of claim 11, wherein the electric heating element is configured to be in contact with a least a portion of the adapter and wherein the electric heating element is configured such that heat from the electric heating element is transferred to the DEF fluid contained within the adapter cavity.

17. The thermal controlled hose assembly of claim 11, further comprising a flow control means, wherein the flow control means is associated with the fluid flow channel to control the flow of the DEF fluid flowing into the inlet port, through the fluid flow channel and out of the outlet port.

18. The thermal controlled hose assembly of claim 17, wherein the flow control means is a controllable valve, wherein the controllable valve is configured to control at least one of a volume and flow rate of the fluid flowing out of the outlet port.

19. The thermal controlled hose assembly of claim 11, wherein the electric heating element is configured to heat up when the external environment temperature falls below approximately about 12° F.

20. A method for controlling a thermal controlled hose assembly for dispensing DEF fluid, wherein the thermal controlled hose assembly includes a dispensing nozzle having a nozzle structure which includes a nozzle structure external surface, the method comprising:
- associating a thermal controlled hose assembly with a DEF fluid dispensing system, wherein the thermal controlled hose assembly includes a controllable flexible heating element which includes a power wire associated with the nozzle structure external surface;
- determining the outside temperature proximate the DEF fluid dispensing system; and
- if the outside temperature is approximately about 12° F. or lower, then causing the controllable flexible electric heating element to emit heat.

* * * * *